(12) United States Patent
Pandian

(10) Patent No.: US 10,977,629 B2
(45) Date of Patent: Apr. 13, 2021

(54) COMPUTERIZED MESSAGING MODULE FOR BLOCKCHAIN NETWORKS

(71) Applicant: ORACLE FINANCIAL SERVICES SOFTWARE LIMITED, Mumbai (IN)

(72) Inventor: Mahendran Muthu Pandian, Bangalore (IN)

(73) Assignee: Oracle Financial Services Software Limited, Mumbai (IN)

( * ) Notice: Subject to any disclaimer, the term of this patent is extended or adjusted under 35 U.S.C. 154(b) by 160 days.

(21) Appl. No.: 16/137,816

(22) Filed: Sep. 21, 2018

(65) Prior Publication Data

US 2019/0102761 A1 Apr. 4, 2019

(30) Foreign Application Priority Data

Sep. 29, 2017 (IN) .............................. 201721034641

(51) Int. Cl.
*H04L 29/06* (2006.01)
*H04L 29/08* (2006.01)
*G06Q 20/10* (2012.01)

(52) U.S. Cl.
CPC ........... *G06Q 20/108* (2013.01); *H04L 69/08* (2013.01); *H04L 67/10* (2013.01)

(58) Field of Classification Search
CPC ........... H04L 2209/38; H04L 2209/356; H04L 9/3236; H04L 69/08; H04L 67/10;
(Continued)

(56) References Cited

U.S. PATENT DOCUMENTS

| 2017/0085555 | A1 | 3/2017 | Bisikalo et al. |
| 2017/0091397 | A1 | 3/2017 | Shah |

(Continued)

FOREIGN PATENT DOCUMENTS

| CN | 106230852 A | 12/2016 |
| CN | 106504089 A | 3/2017 |

(Continued)

OTHER PUBLICATIONS

R. Neisse et al. A Blockchain-Based Approach for Data Accountability and Provenance Tracking. European Commission Joint Research Centre (JRC). ARES '17, Aug. 29-Sep. 1, 2017, Reggio Calabria, Italy. (Year: 2017).*

ICICI Bank, ICICI Bank executes India's first banking transactions on blockchain in partnership with Emerates; pp. 1-2, Oct. 12, 2016; downloaded from: https://www.icicibank.com/aboutus/article.page?identifier=news-icici-bank-executes-indias-first-banking-transactions-on-blockchain-in-partnership-with-emirates-nbd-20161210162515562.

(Continued)

*Primary Examiner* — Virpi H Kanervo
(74) *Attorney, Agent, or Firm* — Kraguljac Law Group, LLC

(57) ABSTRACT

Systems, methods, and other embodiments associated with transmission of messages over a blockchain network are described. In one embodiment, a method includes extracting message data from a source database. The message data is evaluated to identify a message type of the message. A message template is selected from a set of message templates based upon the message template corresponding to the message type of the message. The message data is decomposed into a set of parameter values that are populated into the message template to create a transaction message in the blockchain message format. The transaction message is routed to a blockchain node for routing over the blockchain network.

20 Claims, 8 Drawing Sheets

(58) Field of Classification Search
CPC .. G06Q 20/065; G06Q 20/401; G06Q 20/108;
G06Q 20/10; G06Q 20/389
See application file for complete search history.

(56) References Cited

U.S. PATENT DOCUMENTS

| | | | |
|---|---|---|---|
| 2017/0103167 A1 | 4/2017 | Shah | |
| 2017/0132625 A1 | 5/2017 | Kennedy | |
| 2017/0132626 A1 | 5/2017 | Kennedy | |
| 2017/0230189 A1 | 8/2017 | Toll et al. | |
| 2018/0024780 A1* | 1/2018 | Yang | G06F 16/00 711/154 |
| 2018/0225640 A1* | 8/2018 | Chapman | G06Q 20/3827 |
| 2018/0227119 A1* | 8/2018 | Bibera | H04L 63/083 |
| 2020/0119925 A1* | 4/2020 | Wang | H04L 9/0637 |
| 2020/0167773 A1* | 5/2020 | Cervenka | G06Q 20/38 |

FOREIGN PATENT DOCUMENTS

| | | | | |
|---|---|---|---|---|
| EP | 3432240 A1 * | 1/2019 | | G06Q 20/401 |
| WO | 2016161073 A1 | 10/2016 | | |

OTHER PUBLICATIONS

HCL Technologies, An Introduction to the CoTrust Platform: HCL's Blockchain Application Platform; pp. 1-6, Sep. 12, 2017; dlwnloaded from: https://www.hcltech.com/blogs/introduction-cotrust-platformsm-hcl-blockchain-application-platform.

unchain.io, Integrate applications with blockchain networks; pp. 1-7, 2017; downloaded from: http://www.unchain.io/#/home.

* cited by examiner

US 10,977,629 B2

COMPUTERIZED MESSAGING MODULE FOR BLOCKCHAIN NETWORKS

CROSS REFERENCE TO RELATED APPLICATIONS

This disclosure claims the benefit of India Provisional Patent Application serial number "201721034641" filed Sep. 29, 2017, titled "Computerized Messaging Module for Blockchain Networks", inventors: Mahendran Muthu Pandian, and assigned to the present assignee, wherein the provisional patent application is hereby incorporated by reference in its entirety.

BACKGROUND

Many entities utilize computers to communicate data over networks. A first bank can transmit a transaction to a second bank to perform a bank transaction such as to transfer money to the second bank. One type of network that can be used to facilitate secure online transactions is a blockchain network. The blockchain network is a decentralized and distributed digital ledger used to record transactions across a plurality of computers so that records cannot be altered retroactively without alteration of all subsequent blocks and the collusion of the blockchain network. This allows participants to verify and audit transactions inexpensively. In this way, the blockchain network provides a high degree of data security.

There are many blockchain network providers that can be used by entities. Each entity can have its own implementation of how to access and use the blockchain network, such as different business use cases for using the blockchain network. Thus, a custom application must be written and tailored to a particular blockchain network provider according to how that blockchain provider implements a blockchain network. The application must also be customized to how the entity will implement the access and use of the blockchain network. Creating, storing, and maintaining custom code for each business use case and blockchain provider is inefficient and wastes substantial amounts of computing resources.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
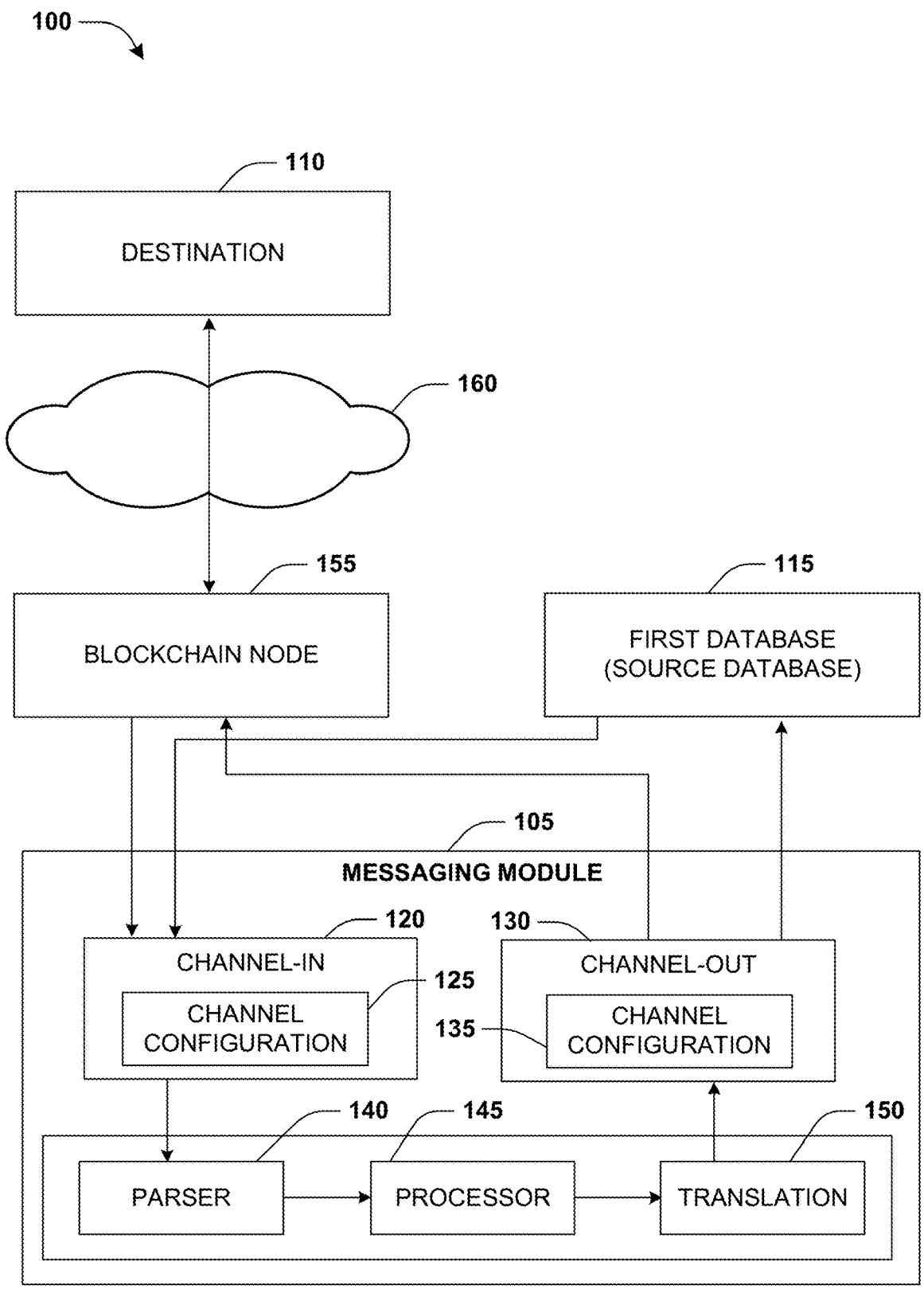
FIG. 1 illustrates an embodiment of a system associated with conversion and transmission of messages over a blockchain network.

Computerized systems and methods are described herein that provide for a messaging module that manages the transmission of messages over a blockchain network. The messaging module is an adapter that is configurable to connect to and communicate over various types of blockchain networks and/or future implementations of blockchain networks. Each blockchain provider can provide their own implementation of a blockchain network that can differ from blockchain network implementations of other blockchain providers. Conventional adapters must be built as individual special purpose adapters that are each specific to a particular blockchain provider and use case. A conventional adapter will only work with the particular blockchain provider and use case, and thus cannot be used with other blockchain providers or use cases.

Accordingly, the present messaging module provides an extensible mechanism for connecting to current and future implementations of blockchain networks. The messaging module is capable of connecting to any type of blockchain network by utilizing message templates that are tailored for different use cases. The use cases correspond to different types of messages/transactions to be communicated over blockchain networks. The messaging module will selectively use a particular message template that is tailored to network requirements of a blockchain network and the particular use case of the message to be transmitted over the blockchain network. The message template is also implemented as a configuration file that provides instructions to a blockchain node for how to read incoming messages from the messaging module. Instead of having to create new individual special purpose adapters, new message templates can be created for each new use case. In this way, a substantial amount of computing and storage resources can be conserved because custom programming code does not have to written, stored, and executed as individual special purpose adapters for each type of blockchain network and use case.

The messaging module is also configurable to connect to and communicate with various types of applications that are to communicate over the blockchain network. In one embodiment, the messaging module is configured to connect to a source database (a flexcube). The messaging module extracts message data from the source database according to a database data format, such as a SWIFT format. The messaging module evaluates the message data to identify a message type of the message data. The message type is used to select a message template, having the message type, from a set of message templates. The messaging module creates a transaction message by populating the message data into the selected message template. The transaction message has a blockchain message format tailored to the particular blockchain network. In this way, message data from the source database is transformed into the transaction message in the blockchain message format, which can be read by the blockchain node using the message template. By using message templates, the messaging module can facilitate the implementation of various types of business use cases without the need to create custom programming code for each use case.

With reference to FIG. 1, one embodiment of a computer system 100 associated with managing the transmission of messages over a blockchain network 160 is illustrated. The computer system 100 includes a messaging module 105 that is an adapter for facilitating communication over any type of blockchain network. The messaging module 105 is a configurable adapter capable of recognizing, translating and formatting data from different applications such as a first database 115 (a source database) for transmission over various types of blockchain networks. The messaging module 105 uses message templates to create transaction messages for various use cases that can be read and transmitted over any type of blockchain network. Each message template is tailored to a particular message type/use case. Thus, when message data from the first database 115 is to be transmitted over a particular type of blockchain network 160, the messaging module 105 selects an appropriate message template from a set of message templates based upon a message type of the message data. Parameter values are extracted from the message data, and are populated into the message template to create a transaction message. The transaction message is routed to a blockchain node 155 (e.g., a transaction management module) for transmission over the blockchain network 160 to a destination 110. The messaging module 105 provides the message template to the blockchain node 155 to use as instructions for how to read the transaction message for transmission over the blockchain network 160.

In one embodiment, the messaging module 105 is configured to connect to a first bank application of a first bank for communicating messages over the blockchain network 160 to a second bank application of a second bank. The first bank application stores data in the first database 115 according to a database data format, such as the SWIFT format. Accordingly, the messaging module 105 connects to the first database 115 in order to extract message data from the first database 115 in the database data format. The messaging module 105 connects to the first database 115 using a channel-in interface 120 and a channel-out interface 130. The messaging module 105 uses the channel-in interface 120 to receive data according to various protocols and data formats. The messaging module 105 uses the channel-out interface 130 to transmit out data according to various protocols and data formats.

The blockchain node 155 is configured to manage transactions that occur between participants of the blockchain network 160 in a distributed manner across a plurality of computing devices. That is, in the blockchain network 160, information exists as a shared and continually reconciled data structure (e.g., blocks or records), such as a database or distributed ledger used to store transactions and results of transactions between participants. In one embodiment, a particular use case is where a transaction corresponds to the first bank debiting an amount of money from a first customer's account and the second bank crediting that amount of money to a second customer's account. The debt and credit operations of the transaction are recorded within the distributed ledger stored across the plurality of computing devices of the blockchain network 160. The blockchain node 155 comprises a transaction management module. The transaction management module is configured to process, record, and validate the result of the debt and credit operations within the distributed ledger.

The decentralized data structure, such as the distributed ledger maintained by a distributed ledger system, is not stored in any single location, and thus there is no centralized version of the information that is easily corrupted. In one embodiment, identical blocks of information are stored across the plurality of computing devices (blockchain nodes) of the blockchain network 160. Thus, each computing device in the blockchain network 160 can comprise a decentralized data structure, such as the distributed ledger, of transactions facilitated by the transaction management module of the blockchain node 155 and/or other instances of the transaction management module associated with other computing devices of the blockchain network 160. The transaction management module manages transactions whose data is distributed throughout computing devices of the blockchain network 160. In this way, the transaction management module and/or other instances of the transaction management module throughout the blockchain network 160 can store, update, manage, track, and verify data stored across the plurality of computing devices, such as transactions between participants.

The messaging module 105 is configured to parse, process, and format messages that are communicated across the blockchain network 160 between the computing devices across which the decentralized data structure is stored for tracking transactions facilitated by transaction management modules. Such messages correspond to commands and data transmitted between the distributed ledger system and the computing devices of the blockchain network 160 for performing and recording transactions. Various configurations can be used by the blockchain node 155 and/or the messaging module 105 to support the different types of applications, blockchain network engines, databases, authentication sources, authentication mechanism, and implementations that can be used across the blockchain network 160. Such configurations can be used to authenticate users, utilize various communication protocols, format messages into various formats used by recipients, identify and authenticate participants of a transaction, transmit notifications of transactions, flag transactions that do not meet pre-defined compliance parameters, etc. The configurations can be used to search participants and their transactions. The configurations can also be used to manage subscriptions for notifications of transactions.

In one embodiment, the blockchain node 155 and/or the messaging module 105 are part of a configurable adapter used to integrate two systems, such as two financial applications, to use blockchain technology for specific use cases. The adapter facilitates easy transformations and processing of information between traditional applications and blockchain data sets.

The adapter can perform various operations on the blockchain network 160. In one embodiment, the adapter can read a specific transaction in a distributed ledger system, such as a hyper ledger, that maintains a distributed ledger of transactions. The adapter can create new transactions in the distributed ledger. The adapter can update existing transactions in the distributed ledger, such as where the distributed ledger system posts a new transaction in the blockchain network 160 while an underlying network record gets updated according. The adapter can listen for notifications arriving from the distributed ledger system.

The adapter can support various protocols. In one embodiment, the adapter provides outward and inward communication to the distributed ledger system using JavaScript Object Notification (JSON) over HTTP. Outward and inward communication on the adapter can use a two-task common (TTC) protocol or JSON over HTTP based upon a channel selection.

The channel-in interface 120 comprises a channel configuration 125 specifying various types of mechanisms that the channel-in interface 120 can use for receiving messages from the blockchain node 155 and/or various types of applications. The channel-in interface 120 can use a query change notification mechanism for communicating notifications of messages through the first database 115 and/or a database populated by the blockchain node 155. The query change notification mechanism may correspond to the first database 115 sending real-time notifications to the messaging module 105. A notification may correspond to a change made to a message table within the first database 115. Upon receiving the notification, the messaging module 105 can transform the message from a database data format to a distributed ledger format (e.g., transform the message into block data structures having a blockchain network format) for processing. For example, parameter values, extracted from the message, are formatted as one or more blocks (e.g., a list of records) that are linked using cryptography. Each block contains a cryptographic hash of a previous block, a timestamp, and transaction data such as the parameter values (e.g., represented as a merkle tree root hash). The blocks are represented as a distributed ledger that can record transactions between two entities, such as a transaction stored within a transaction message between the first database 115 and a second database.

In one embodiment, the channel-in interface 120 can use a queue mechanism to communicate messages through a queue. In another embodiment, the channel-in interface 120 can use a table polling mechanism specifying that the messaging module 105 is to pull messages from tables of the first database 115 and/or a message table populated with messages by the blockchain node 155. In another embodiment, the channel-in interface 120 can use a hypertext transfer protocol (HTTP) representation state transfer (REST) mechanism for receiving messages from a RESTful server. In another embodiment, the channel-in interface 120 can use a socket mechanism to receive messages from the blockchain node 155 and/or the first database 115 at a specific socket port. In another embodiment, the channel-in interface 120 can use a simple object access protocol (SOAP) mechanism for communication.

The adapter provides outbound communication flow from a computing device of a participant out over the blockchain network 160. In one embodiment, the adapter receives a smart contract (a message) from the channel-in interface 120 from a financial system according to a particular channel configuration. The smart message can be received using a protocol corresponding to HTTP/RESTful communication, table based communication, polling based communication, queue based communication, the utilization of sockets, etc. The smart contract corresponds to a computer protocol to digitally facilitate, verify, and enforce performance and/or negotiation of a contract, such as to perform a transaction between participants. The smart contract is routed to the appropriate message processing unit, such as the messaging module 105. The message processing unit is a group of parsers, processors, and transformers chained together by a configuration. Upon completion of the message processing unit parsing, processing business logic upon the transaction, and transforming the smart contract into a target format understandable by recipient device, the processed smart contract is routed out through the channel-out interface 130 that sends the smart contract to the distributed ledger system. The smart contract is routed utilizing protocols corresponding to HTTP/RESTful communication, table based communication, queue based communication, the utilization of sockets, etc.

The channel-out interface 130 comprises a channel configuration 135 specifying various types of mechanisms that the channel-out interface 130 can use for transmitting messages to the blockchain node 155 and/or various types of applications. In one embodiment, the channel-out interface 130 can use a table out mechanism where messages are written to a table that can be read by the blockchain node 155 and/or are written to the first database 115. In another embodiment, the channel-out interface 130 can use a queue mechanism where messages are written to the queue to be read by the blockchain node 155 and/or the first database 115. In another embodiment, the channel-out interface 130 can use an HTTP/REST mechanism for transmitting messages such as through a RESTful server. In another embodiment, the channel-out interface 130 can use a socket mechanism for transmitting messages to a particular socket that can be read by the blockchain node 155 and/or various types of applications.

In one embodiment, the adapter provides inbound communication flow from the blockchain network 160. The adapter receives a smart contract from the channel-in interface 120 from the distributed ledger system according to a channel configuration. The smart contract is routed to a message processing unit that processes the smart contract. The processed smart contract is sent to the financial system.

In one embodiment, the messaging module 105 extracts message data from the first database 115 through the channel-in interface 120 according to a corresponding channel configuration 125 used by the first database 115. For example, a polling mechanism is used to query the first database 115 and extract the message data. The message data is extracted in a database format, such as a SWIFT format, used by the first database 115 to store the message data. The message data may be extracted from various tables and/or rows within the first database 115. The message data may correspond to a transaction that is to be executed between two entities, such as a bank transaction between two banks. The message data may comprise a reference number, a currency type, a transaction type such as a debit or credit, an amount, a message status, a date, a source name, a source bank ID, a destination name, a destination bank ID, and/or a variety of other information associated with the transaction. The message data is to be transmitted as a transaction message over the blockchain network 160 that supports a blockchain message format different than the database data format.

A parser component 140 can parse the message data based upon a parser configuration specifying how to parse the message data having the database format. In one embodiment, the message data is parsed into a customized java object that can be understood by other components within the message module 105. The parser component 140 may parse the message data based upon what channel configuration 125 was used to receive the message data, such as using parsing logic tailored to the query change notification mechanism or the table polling mechanism.

The parser component 140 evaluates the message data to identify a message type of the message to be transmitted over the blockchain network 160. The message type may correspond to a particular use case of the adapter. The message type may correspond to a debit transaction or a credit transaction between banks, a warehouse shipping transaction between two companies, a purchase transaction between two entities, or any other type of information that may be transmitted between two computers/applications.

The messaging module 105 maintains a set of message templates corresponding to different message types (use cases). A first message template may correspond to a debit transaction, a second message template may correspond to a credit transaction, a third template may correspond to a purchase transaction, etc. Each message template is tailored to a particular message type/use case. The message templates are also used as configuration files by the blockchain node 155 as instructions for how to read data, such as transaction messages, output by the messaging module 105. The messaging module 105 selects a message template from the set of message templates based upon the message template corresponding to the message type of the message.

The parser component 140 parses the message data to decompose the message data into a set of parameter values. The parameter values correspond to values of fields extracted from tables and rows of the first database 115 as the message data. The parameter values may correspond to a reference number, a currency type, a transaction type such as a debit or credit, an amount, a message status, a date, a source name, a source bank ID, a destination name, a destination bank ID, and/or a variety of other information associated with the message.

A processor component 145 is configured to process the message data, such as the extracted parameter values, based upon a processor configuration. In one embodiment, the processor component 145 removes parameter values from the set of parameter values extracted from the message data based upon the parameter values not being supported by the blockchain message format of the blockchain network 160. The message template specifies what parameter types are supported by the blockchain network 160. Any parameter values for parameter types not specified as being supported by the message template are removed. In another embodiment, the processor component 145 adjusts the size of parameter values that exceed a size limit supported by the blockchain message format. For example, the blockchain network 160 supports parameter values up to a maximum number of characters. Any parameter values having characters exceeding the maximum number of characters are adjusted. The adjustment may correspond to truncating a parameter value, splitting a parameter value into two sub-parameter values that can be rejoined at the destination 110, etc.

In another embodiment, the processor component 145 executes a date validation process upon the set of parameter values to validate data parameter values to populate into the message template. For example, a transaction date is validated to ensure that the transaction date is not a future transaction date or a date that is invalid/incorrect. If an invalid date is identified, then an error message can be generated. Also, the invalid date can be removed from the set of parameter values, flagged as invalid, or adjusted to a correct value.

In another embodiment, the processor component 145 executes an arithmetic calculation using one or more parameter values as input to calculate a result as a parameter value to populate into the message template. For example, the arithmetic calculation corresponds to the calculation of a total price for a product that takes into account a base price value, a tax value, and a shipping value. In another embodiment, a logical operation is executed using one or more parameter values as input to calculate a result as a parameter value to populate into the message template. For example, an external or internal API is called to execute business logic, such as to perform an interest calculation. In yet another embodiment, a transformation operation is executed upon a parameter value to transform the parameter value to create a transformed parameter value to populate into the message template. For example, the transformation operation is executed to perform data enrichment, such as to change a country code from "US" to "USA" because the destination 110 supports/understands only "USA".

A translation component 150 is configured to populate the selected message template with the processed set of parameter values to create the transaction message in the blockchain message format. The message template may comprise parameters (fields) into which the parameter values are inserted. The message template can also be used by the blockchain node 155 as a configuration file of instructions for how the blockchain node 155 can read the transaction message for transmission over the blockchain network 160.

The messaging module 105 routes the transaction message through the channel-out interface 130 according to the channel configuration 135 (e.g., selectively using communication functionality used by the blockchain node 155). Similarly, the messaging module 105 can receive a second transaction message from the blockchain node 155 through the channel-in interface 120 according to the channel configuration 125 (e.g., selectively using communication functionality used by the blockchain node 155). The parser component 140, the processor component 145, and the translation component 150 can process the second transaction message. For example, the second transaction message is evaluated to identify a second message type of the second transaction message. A second message template is selected from the set of message templates based upon the second message template corresponding to the second message type (e.g., the template is associated with and/or assigned to the message type using definitions or mappings). The second transaction message is decompose into a set of message data values that are populated into the second message template to create a database transaction in the database data format. The database transaction is executed to populate the message data values into the first database 115.

Figure 2:
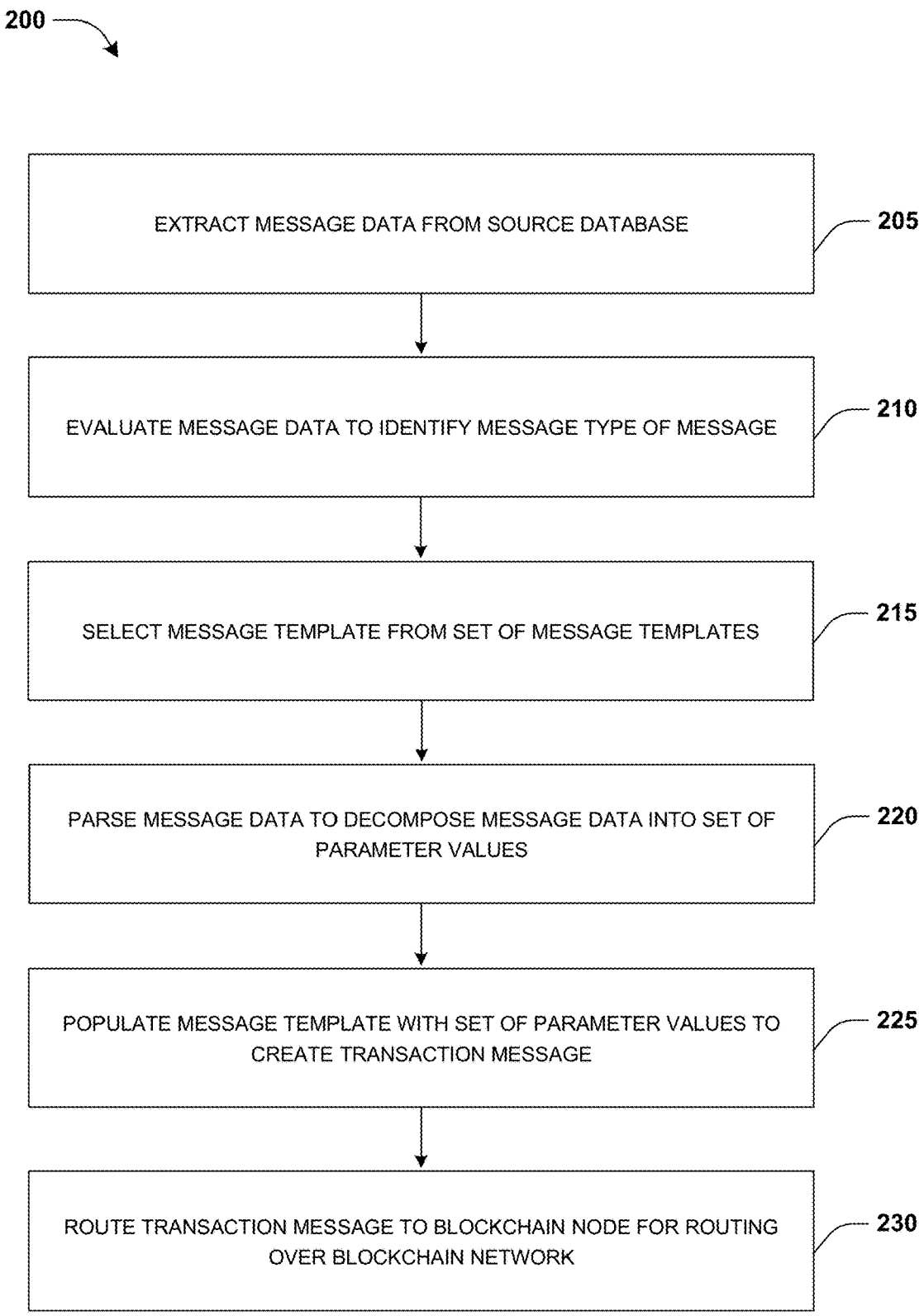
FIG. 2 illustrates an embodiment of a method associated with conversion and transmission of messages over a blockchain network.

With reference to FIG. 2, one embodiment of a computer implemented method 200 is illustrated associated with system 100 that can process different types of messages and convert the messages into a designated block format for transmission and inclusion of the block in a blockchain network. In one embodiment, the method 200 is performed by the messaging module 105 of FIG. 1 utilizing various computing resources of a computer, such as a processor for executing instructions associated with receiving, processing, and transmitting messages. Memory and/or disks are used for storing message data, parser configuration data, processor configuration data, translation configuration data, message templates, etc. Network hardware is used for communicating data structures and/or other data between the computer and remote computers over a network, such as the blockchain network 160. The method 200 is triggered upon receiving a command to transmit a message over the blockchain network 160.

Figure 3A:
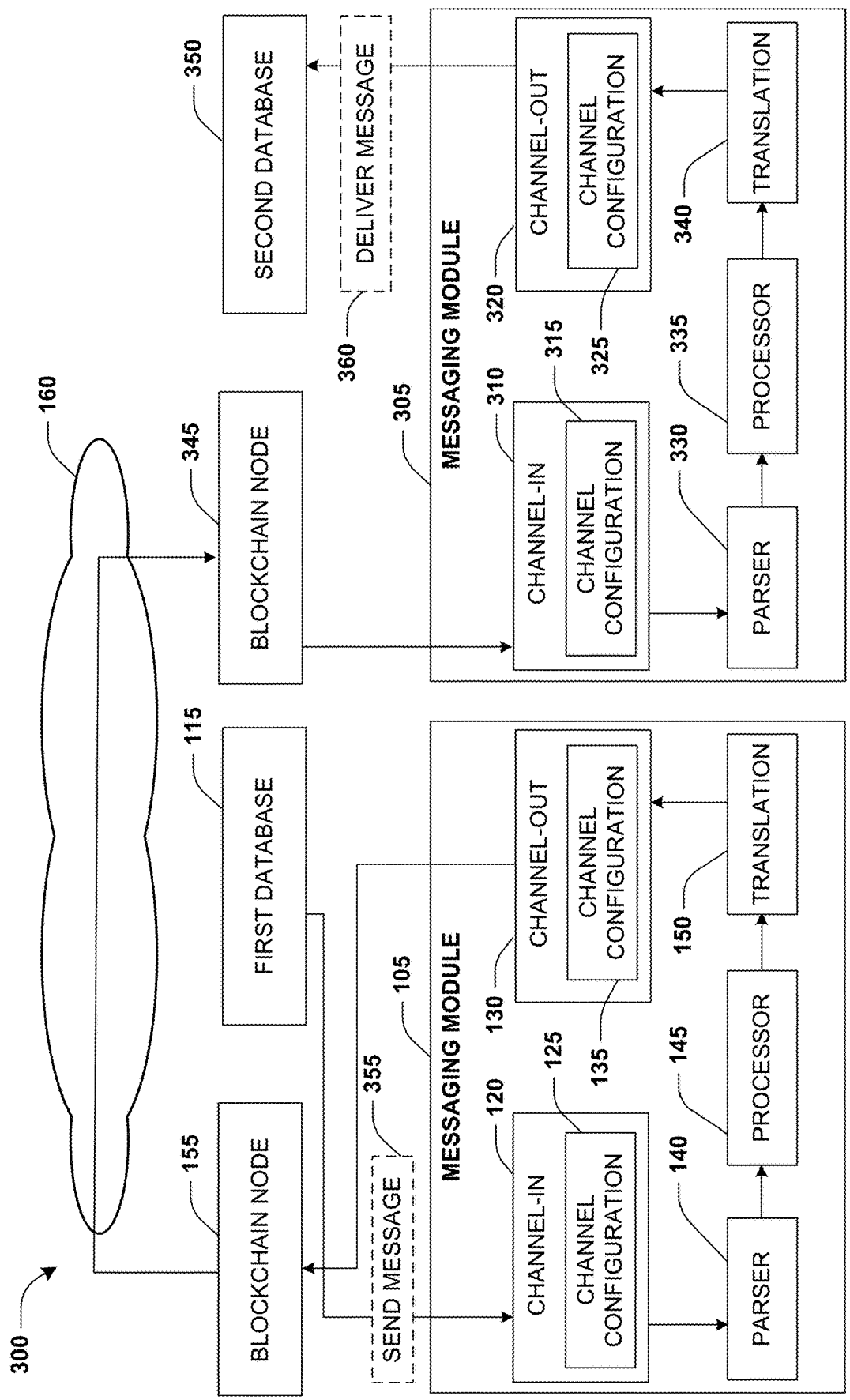
FIG. 3A illustrates an embodiment of a system associated with transmission of messages over a blockchain network, where a message is transmitted from an application to a second application.

At 205, message data is extracted from a first database 115, as illustrated by example system 300 of FIG. 3A. The message data is extracted according to a database data format used by the first database 115 to store the message data. The message data is received through a channel-in interface 120 according to a channel configuration 125 (e.g., a selection and implementation of communication functionality used by the first database 115). The message data is to be transmitted 355 as a transaction message over the blockchain network 160 that supports a blockchain message format different than the database data format. In one embodiment, the message data corresponds to a message (a transaction) that is being sent by a first application to a second application over the blockchain network 160.

At 210, the message data is evaluated to identify a message type of the message, such as by the parser component 140. The message data may comprise a message type parameter having a parameter value specifying the message type, such as a debit message, a credit message, a purchase order message, a sales order message, etc. The parameter value is identified and extracted from the message type parameter.

At 215, a message template is selected from a set of message templates corresponding to different message types. Each message template is previously generated and defined for a particular message type, and may be stored in a library of templates. The set of message templates allows the present system and method to handle many different types of messages and convert the different types of messages into a block format for a blockchain. As such the messaging module 105 functions as a universal adaptor rather than being configured to handle one specific type of message.

Continuing with block 215, the message template is selected based upon the message template corresponding to, matching, and/or being associated with the message type of the message. For example, the message template comprises a message type parameter value that matches the parameter value of the message type parameter. Each message template is tailored to a specific message type/use case. A message template has parameters into which parameter values, extracted from message data, can be inserted. The message templates are also used as configuration files by the blockchain node 155 as instructions for how to read data, such as transaction messages, output by the messaging module 105.

At 220, the message data is parsed to decompose the message data into a set of a parameter values. In one embodiment, the parser component 140 is configured to parse message data having the database data format, such as the SWIFT format. The parser component 140 parses the message data to identify parameters within the message data. The parser component extracts the parameter values of the parameters.

The processor component 145 is configured to process the parameter values to create processed parameter values. In one embodiment, the processor component 145 removes parameter values from the set of parameter values based upon the parameter values not being supported by the blockchain message format of the blockchain network 160. The message template specifies what parameter types are supported by the blockchain network 160 and/or what parameter values and ranges are valid. Any parameter values for parameter types not specified as being supported by the message template are removed. In another embodiment, the processor component 145 adjusts the size of parameter values that exceed a size limit supported by the blockchain message format. For example, the blockchain network 160 supports parameter values up to a maximum number of characters. Any parameter values having characters exceeding the maximum number of characters are adjusted. The adjustment may correspond to truncating a parameter value, splitting a parameter value into two sub-parameter values, etc.

In another embodiment, the processor component 145 executes a date validation process upon the set of parameter values to validate data parameter values to populate into the message template. For example, a transaction date is validated to ensure that the transaction date is not invalid, such as a future dated transaction. If an invalid date is identified, then an error message can be generated, the invalid date can be removed from the set of parameter values, the invalid date can be changed or flagged, etc.

In another embodiment, the processor component 145 executes an arithmetic calculation using one or more parameter values as input to calculate a result as a parameter value to populate into the message template. For example, the arithmetic calculation corresponds to the calculation of a total order quantity that takes into line item order quantities of different items of a purchase order. In another embodiment, a logical operation is executed using one or more parameter values as input to calculate a result as a parameter value to populate into the message template. For example, an external or internal API is called to execute business logic, such as to perform warehouse inventory analysis. In yet another embodiment, a transformation operation is executed upon a parameter value to transform the parameter value to create a transformed parameter value to populate into the message template. For example, the transformation operation is executed to perform data enrichment, such as to change zip code from a 5 digit zip code to a full 9 digit zip code.

At 225, the processed set of parameter values are populated into the message template to create a transaction message in the blockchain message format. In one embodiment, the translation component 150 identifies parameters within the message template. Parameter types of the parameters are matched with corresponding parameter types of the parameter values within the processed set of parameter values. In this way, parameter values are inserted into parameters, within the message template, having matching parameter types.

In one embodiment, the transaction parameter is formatted as one or more blocks (e.g., a record or a list of records) that are linked using pointers and cryptography for insertion into a blockchain. In one embodiment, each block contains a cryptographic hash of a previous block, a timestamp, and transaction data such as the parameter values inserted into the message template (e.g., represented as a merkle tree root hash). The blocks are represented as a distributed ledger that can record transactions between two entities, such as the transaction stored within the transaction message between the first database 115 and the second database 350. Once the transaction message is recorded, any given block cannot be retroactively altered without altering all subsequent blocks, which requires a consensus of a network majority of blockchain nodes of the blockchain network 160.

At 230, the transaction message (now formatted as a block) is routed through the channel-out interface 130 to the blockchain node 155 according to a channel configuration 135 (e.g., a selection and implementation of communication functionality used by the blockchain node 155). The blockchain node 155 routes the transaction message over the blockchain network 160 to a second blockchain node 345 associated with the second database 350 that is the final destination of the transaction message. In this way, the second blockchain node 345 receives the transaction message and transmits the transaction message to a second messaging module 305. The second messaging module 305 receives the transaction message from the second blockchain node 345 through a second channel-in interface 310 according to a channel configuration 315 (e.g., a selection and implementation of communication functionality used by the second blockchain node 345).

A second parser component 330, a second processor component 335, and a second translation component 340 of the second messaging module 305 process the transaction message to create a database transaction based upon message data values extracted from the transaction message. For example, the transaction message is decomposed into a set of message data values. The set of message data values are populated into a message template corresponding to a message type of the transaction message to create the database transaction in the database data format. The database transaction is routed through a second channel-out interface 320 for delivery 360 to the second database 350 according to a channel configuration 325 (e.g., a selection and implementation of communication functionality used by the second database 350). In particular, the database transaction is executed to insert the set of message data values into the second database 350.

Figure 3B:
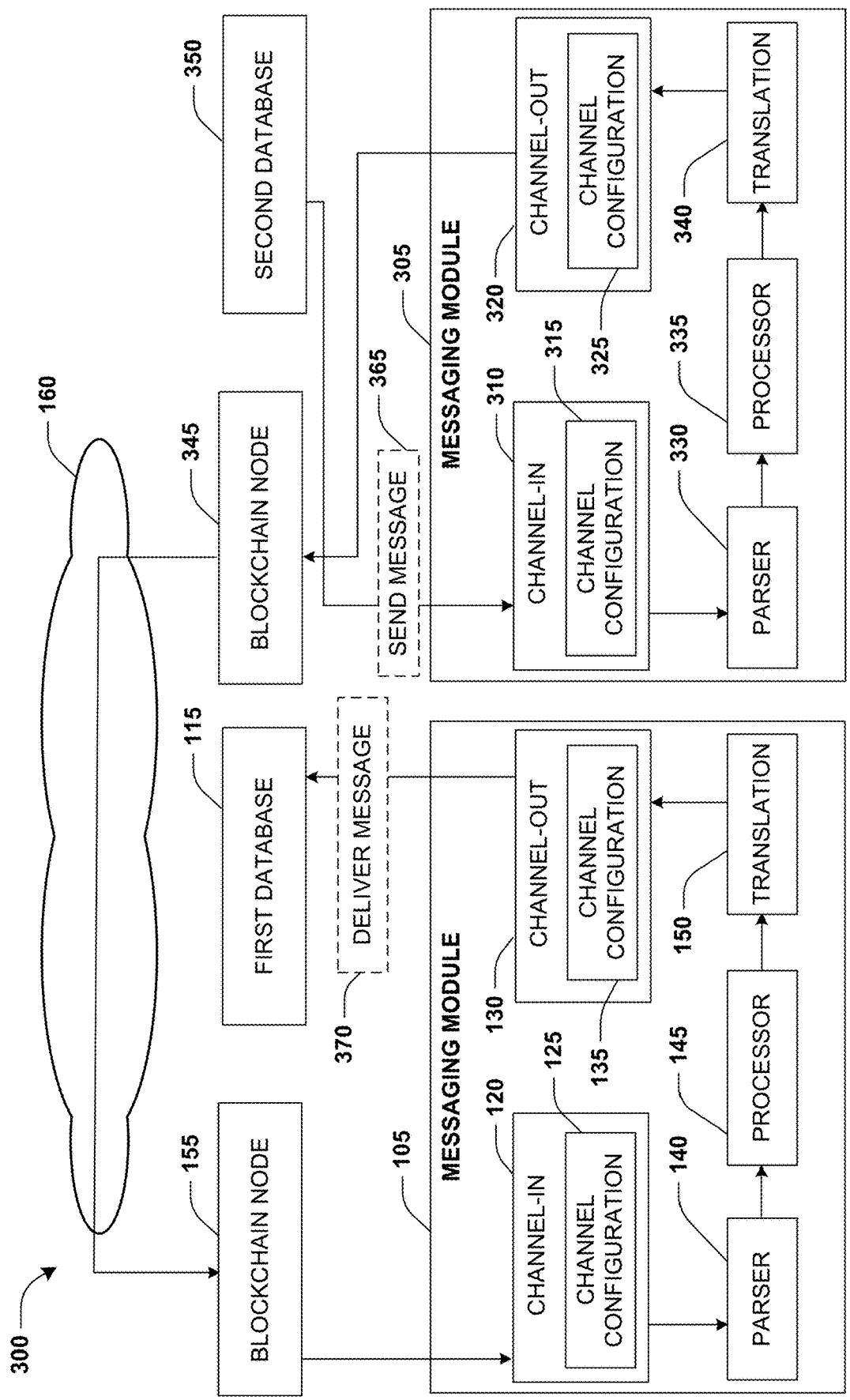
FIG. 3B illustrates an embodiment of a system associated with transmission of messages over a blockchain network, where an application receives a message from a second application.

In a similar manner, the second database 350 can send 365 a second message for delivery 370 to the first database 115, as illustrated in FIG. 3B. The second messaging module 305 extracts second message data of the second message from the second database 350. The second message data is evaluated to identify a second message type of the second message. For example, the second message type may be different than the message type of the message sent by the first database 115. A second message template is selected from a second set of message templates based upon the second message template corresponding to the second message type. The second message data is parsed to decompose the second message into a second set of parameter values that are populated into the second message template to create a second transaction message in the blockchain message format. The second transaction message is routed through the channel-out interface 310 to the second blockchain node 345 for transmission through the blockchain network 160 to the first database 115. In this way, the message module 105 processes and provides the second transaction message to the first database 115.

Figure 4:
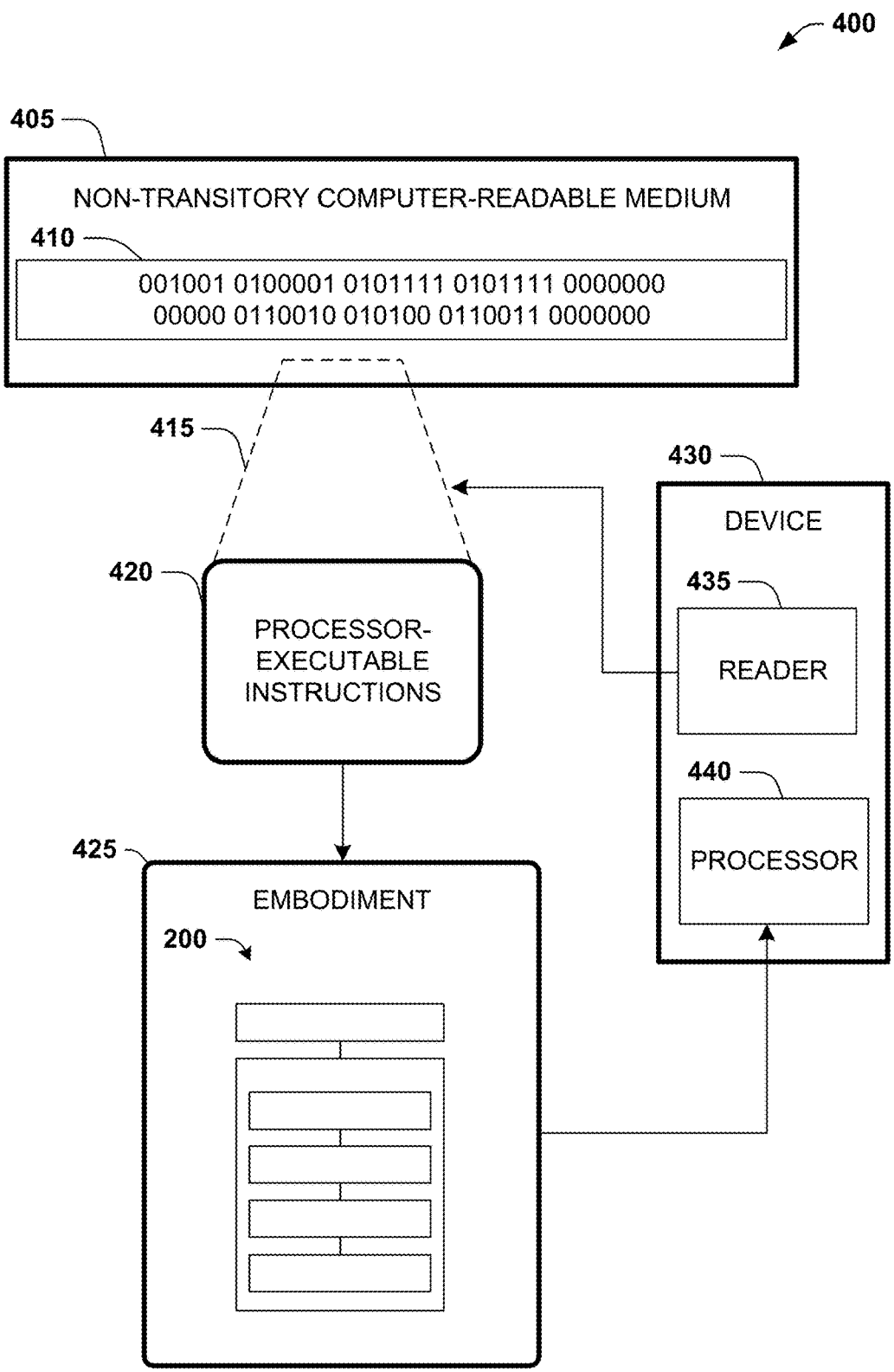
FIG. 4 illustrates an embodiment of a non-transitory computer-readable medium.

FIG. 4 is an illustration of a scenario 400 involving an example non-transitory computer-readable medium 405. In one embodiment, one or more of the components described herein are configured as program modules, such as the messaging module 105, stored in the non-transitory computer-readable medium 405. The program modules are configured with stored instructions, such as processor-executable instructions 420, that when executed by at least a processor, such as processor 440, cause the computing device to perform the corresponding function(s) as described herein. In one embodiment, the, functionality of the messaging module 105, stored in the non-transitory computer-readable medium 405, may be executed by the processor 440 as the processor-executable instructions 420 to perform an embodiment 425 of the method 200 of FIG. 2.

The non-transitory computer-readable medium 405 includes the processor-executable instructions 420 that when executed by a processor 440 cause performance of at least some of the provisions herein. The non-transitory computer-readable medium 405 includes a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory computer-readable medium 405 stores computer-readable data 410 that, when subjected to reading 415 by a reader 435 of a device 430 (e.g., a read head of a hard disk drive, or a read operation invoked on a solid-state storage device), express the processor-executable instructions 420.

In some embodiments, the processor-executable instructions 420, when executed cause performance of operations, such as at least some of the example method 200 of FIG. 2, for example. In some embodiments, the processor-executable instructions 420 are configured to cause implementation of a system, such as at least some of the example system 100 of FIG. 1, for example.

Figure 5:
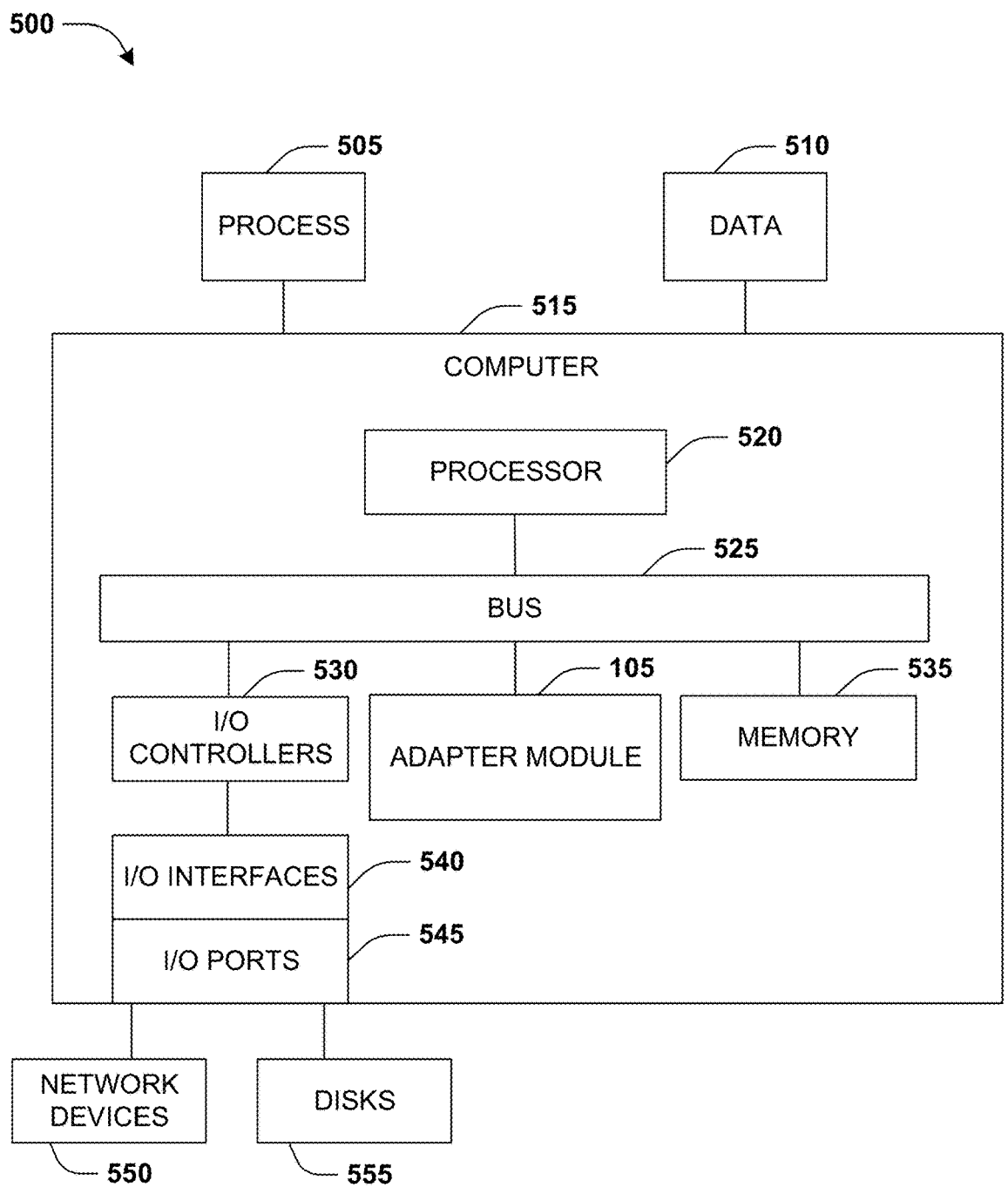
FIG. 5 illustrates an embodiment of a computing system configured with the example systems and/or methods disclosed.

FIG. 5 illustrates an example computing device 500 that is configured and/or programmed with one or more of the example systems and methods described herein, and/or equivalents. The example computing device 500 may be the computer 515 that includes a processor 520, a memory 535, and I/O ports 545 operably connected by a bus 525. In one embodiment, the computer 515 may include logic of the messaging module 105 configured to facilitate the system 100 and/or the method 200 shown in FIGS. 1-2. In different embodiments, the logic of the messaging module 105 may be implemented in hardware, a non-transitory computer-readable medium 505 with stored instructions, firmware, and/or combinations thereof. While the logic of the messaging module 105 is illustrated as a hardware component attached to the bus 525, it is to be appreciated that in other embodiments, the logic of the messaging module 105 could be implemented in the processor 520, stored in memory 535, or stored in disk 555.

In one embodiment, logic of the messaging module 105 or the computer 515 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an application specific integrated circuit (ASIC) programmed to implement rule based source sequencing for allocation. The means may also be implemented as stored computer executable instructions that are presented to computer 515 as data 510 that are temporarily stored in memory 535 and then executed by processor 520.

The logic of the messaging module 105 may also provide means (e.g., hardware, non-transitory computer-readable medium 505 that stores executable instructions, firmware) for performing rule based source sequencing for allocation.

Generally describing an example configuration of the computer 515, the processor 520 may be a variety of various processors including dual microprocessor and other multiprocessor architectures. The memory 535 may include volatile memory and/or non-volatile memory. Non-volatile memory may include, for example, read-only memory (ROM), programmable read-only memory (PROM), and so on. Volatile memory may include, for example, random access memory (RAM), static random-access memory (SRAM), dynamic random access memory (DRAM), and so on.

The disks 555 may be operably connected to the computer 515 via, for example, the I/O interface 540 (e.g., card, device) and the I/O ports 545. The disks 555 may be, for example, a magnetic disk drive, a solid state disk drive, a floppy disk drive, a tape drive, a Zip drive, a flash memory card, a memory stick, and so on. Furthermore, the disks 555 may be a CD-ROM drive, a CD-R drive, a CD-RW drive, a DVD ROM, and so on. The memory 535 can store a process, such as within the non-transitory computer-readable medium 505, and/or data 510, for example. The disk 555 and/or the memory 535 can store an operating system that controls and allocates resources of the computer 515.

The computer 515 may interact with input/output (I/O) devices via the I/O interfaces 540 and the I/O ports 545. The I/O devices may be, for example, a keyboard, a microphone, a pointing and selection device, cameras, video cards, displays, the disks 555, the network devices 550, and so on. The I/O ports 545 may include, for example, serial ports, parallel ports, and USB ports. I/O controllers 530 may connect the I/O interfaces 540 to the bus 525.

The computer 515 can operate in a network environment and thus may be connected to the network devices 550 via the I/O interfaces 540, and/or the I/O ports 545. Through the network devices 550, the computer 515 may interact with a network. Through the network, the computer 515 may be logically connected to remote computers (e.g., the computer 515 may reside within a distributed computing environment to which clients may connect). Networks with which the computer 515 may interact include, but are not limited to, a local area network (LAN), a new area network (WAN), and other networks.

Figure 6:
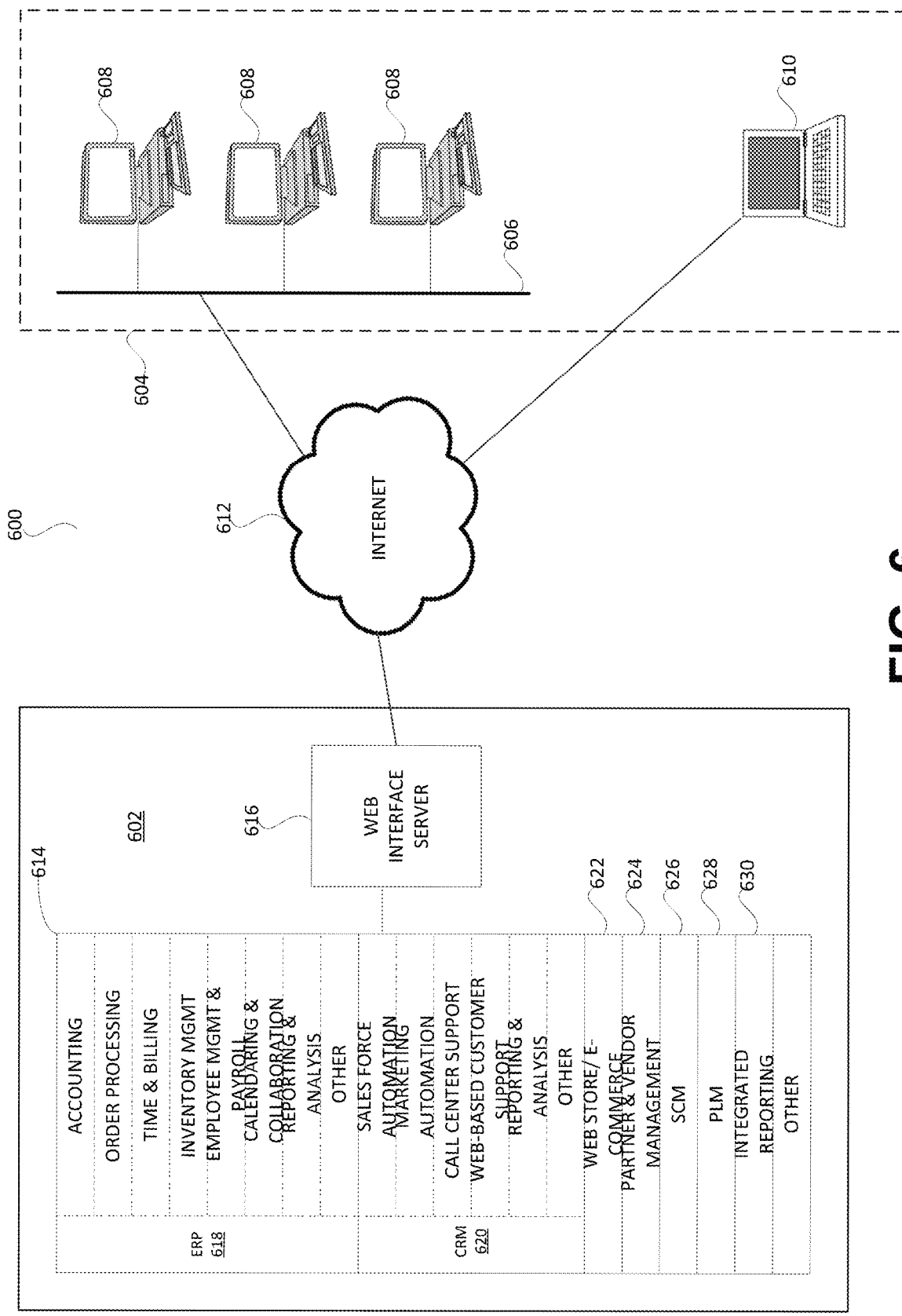
FIG. 6 illustrates an embodiment of an integrated business system and an enterprise network in which an embodiment of the invention may be implemented.

FIG. 6 is a diagram illustrating a system 600 in which an embodiment of the invention may be implemented. Enterprise network 604 may be associated with a business enterprise, such as a retailer, merchant, service provider, or other type of business. Alternatively, and in accordance with the advantages of an application service provider (ASP) hosted integrated business system (such as a multi-tenant data processing platform), the business enterprise may comprise fewer or no dedicated facilities or business network at all, provided that its end users have access to an internet browser and an internet connection. For simplicity and clarity of explanation, the enterprise network 604 is represented by an on-site local area network 606 to which a plurality of personal computers 608 are connected, each generally dedicated to a particular end user, such as a service agent or other employee (although such dedication is not required), along with an exemplary remote user computer 610 that can be, for example, a laptop computer or tablet computer of a traveling employee having internet access through a public Wi-Fi access point, or other internet access method. The end users (consumers) associated with computers 608 and 610 may possess an internet-enabled smartphone or other electronic device (such as a PDA, tablet, laptop computer) having wireless internet access or other synchronization capabilities. Users of the enterprise network 604 interface with the integrated business system 602 across the Internet 612 or another suitable communications network or combination of networks.

Integrated business system 602, which may be hosted by a dedicated third party, may include an integrated business server 614 and a web interface server 616, coupled as shown in FIG. 6. It is to be appreciated that either or both of the integrated business server 614 and the web interface server 616 may be implemented on one or more different hardware systems and components, even though represented as singular units in FIG. 6.

In a typical example in which system 602 is operated by a third party for the benefit of multiple account owners/tenants, each of whom is operating a business, integrated business server 614 comprises an ERP module 618 and further comprises a CRM module 620. In many cases, it will be desirable for the ERP module 618 to share methods, libraries, databases, subroutines, variables, etc., with CRM module 620, and indeed ERP module 618 may be intertwined with CRM module 620 into an integrated Business Data Processing Platform (which may be single tenant, but is typically multi-tenant).

The ERP module 618 may include, but is not limited to, a finance and accounting module, an order processing module, a time and billing module, an inventory management and distribution module, an employee management and payroll module, a calendaring and collaboration module, a reporting and security module, and other ERP-related modules. The CRM module 620 may include, but is not limited to, a sales force automation (SFA) module, a marketing automation module, a contact list module (not shown), a call center support module, a web-based customer support module, a reporting and security module, and other CRM-related modules. The integrated business server 614 (or multi-tenant data processing platform) further may provide other business functionalities including a web store/eCommerce module 622, a partner and vendor management module 624, and an integrated reporting module 630. An SCM (supply chain management) module 626 and PLM (product lifecycle management) module 628 may also be provided. Web interface server 616 is configured and adapted to interface with the integrated business server 614 to provide one or more web-based user interfaces to end users of the enterprise network 604.

The integrated business system shown in FIG. 6 may be hosted on a distributed computing system made up of at least one, but likely multiple, "servers." A server is a physical computer dedicated to providing data storage and an execution environment for one or more software applications or services intended to serve the needs of the users of other computers that are in data communication with the server, for instance via a public network such as the Internet or a private "intranet" network. The server, and the services it provides, may be referred to as the "host" and the remote computers, and the software applications running on the remote computers, being served may be referred to as "clients." Depending on the computing service(s) that a server offers it could be referred to as a database server, data storage server, file server, mail server, print server, web server, etc. A web server is a most often a combination of hardware and the software that helps deliver content, commonly by hosting a website, to client web browsers that access the web server via the Internet.

Figure 7:
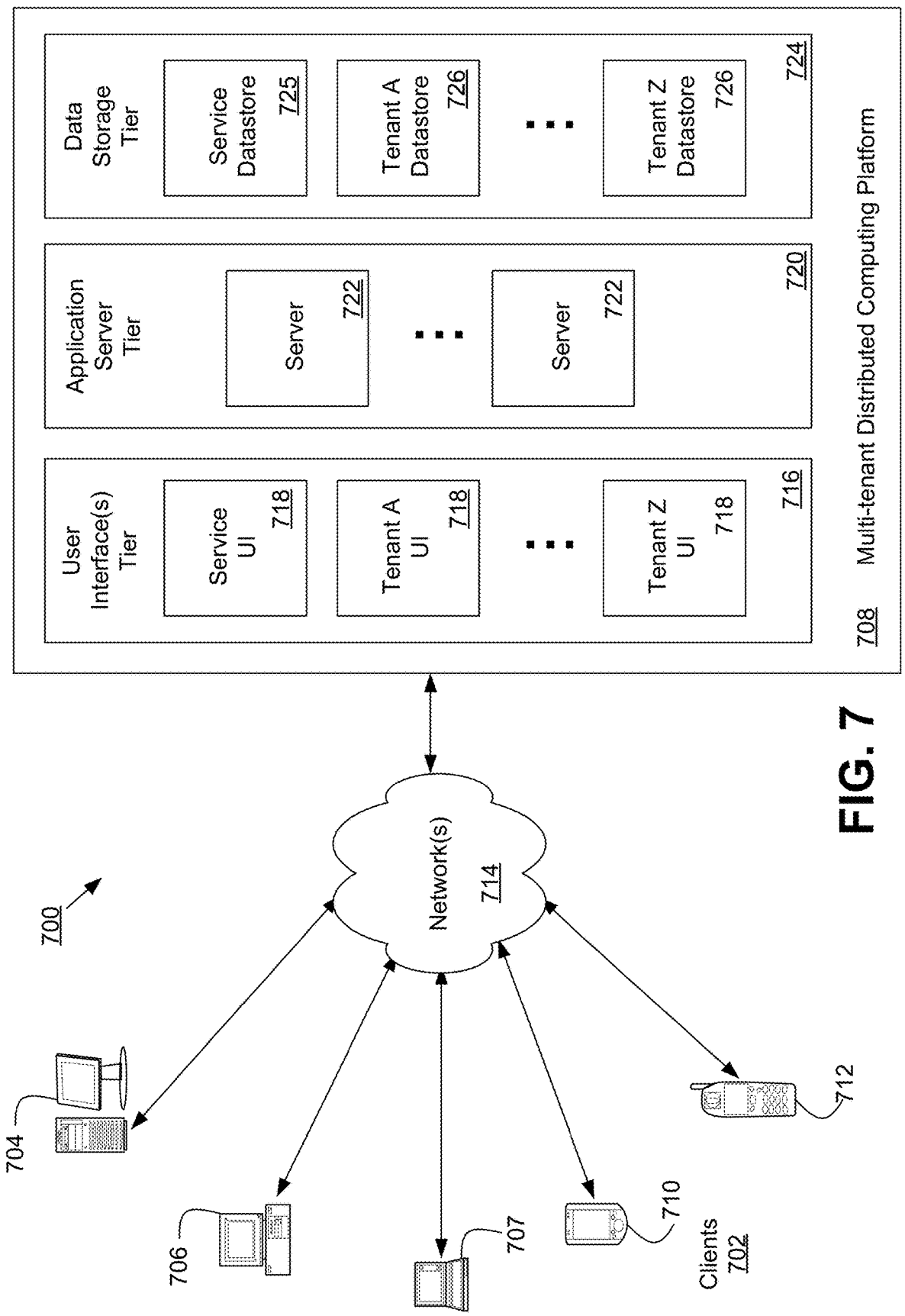
FIG. 7 illustrates an embodiment of a multi-tenant distributed computing service platform.

FIG. 7 is a diagram illustrating elements or components of an example operating environment 700 in which an embodiment of the invention may be implemented. As shown, a variety of clients 702 incorporating and/or incorporated into a variety of computing devices may communicate with a distributed computing service/platform 708 through one or more networks 714. For example, a client may incorporate and/or be incorporated into a client application (e.g., software) implemented at least in part by one or more of the computing devices. Examples of suitable computing devices include personal computers, server computers 704, desktop computers 706, laptop computers 707, notebook computers, tablet computers or personal digital assistants (PDAs) 710, smart phones 712, cell phones, and consumer electronic devices incorporating one or more computing device components, such as one or more electronic processors, microprocessors, central processing units (CPU), or controllers. Examples of suitable networks 714 include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing service/platform (which may also be referred to as a multi-tenant business data processing platform) 708 may include multiple processing tiers, including a user interface tier 716, an application server tier 720, and a data storage tier 724. The user interface tier 716 may maintain multiple user interfaces 718, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs). The default user interface may include components enabling a tenant to administer the tenant's participation in the functions and capabilities provided by the service platform, such as accessing data, causing the execution of specific data processing operations, etc. Each processing tier shown in the figure may be implemented with a set of computers and/or computer components including computer servers and processors, and may perform various functions, methods, processes, or operations as determined by the execution of a software application or set of instructions. The data storage tier 724 may include one or more data stores, which may include a Service Data store 725 and one or more Tenant Data stores 726.

Each tenant data store 726 may contain tenant-specific data that is used as part of providing a range of tenant-specific business services or functions, including but not limited to ERP, CRM, eCommerce, Human Resources management, payroll, etc. Data stores may be implemented with any suitable data storage technology, including structured query language (SQL) based relational database management systems (RDBMS).

In accordance with one embodiment of the invention, distributed computing service/platform 708 may be multi-tenant and service platform 708 may be operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information.

As noted, such business information systems may include an Enterprise Resource Planning (ERP) system that integrates the capabilities of several historically separate business computing systems into a common system, with the intention of streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/material requirements planning (MRP), purchasing, content management systems (CMS), professional services automation (PSA), employee management/payroll, human resources management, and employee calendaring and collaboration, as well as reporting and analysis capabilities relating to these functions. Such functions or business applications are typically implemented by one or more modules of software code/instructions that are maintained on and executed by one or more servers 722 that are part of the platform's Application Server Tier 720.

Another business information system that may be provided as part of an integrated data processing and service platform is an integrated Customer Relationship Management (CRM) system, which is designed to assist in obtaining a better understanding of customers, enhance service to existing customers, and assist in acquiring new and profitable customers. By way of example, the capabilities or modules of a CRM system can include (but are not required to include, nor limited to only including): sales force automation (SFA), marketing automation, contact list, call center support, returns management authorization (RMA), loyalty program support, and web-based customer support, as well as reporting and analysis capabilities relating to these functions. In addition to ERP and CRM functions, a business information system/platform may also include one or more of an integrated partner and vendor management system, eCommerce system (e.g., a virtual storefront application or platform), product lifecycle management (PLM) system, Human Resources management system (which may include medical/dental insurance administration, payroll, etc.), or supply chain management (SCM) system. Such functions or business applications are typically implemented by one or more modules of software code/instructions that are maintained on and executed by one or more servers 722 that are part of the platform's Application Server Tier 720.

Note that both functional advantages and strategic advantages may be gained through the use of an integrated business system comprising ERP, CRM, and other business capabilities, as for example where the integrated business system is integrated with a merchant's eCommerce platform and/or "web-store." For example, a customer searching for a particular product can be directed to a merchant's website and presented with a wide array of product and/or services from the comfort of their home computer, or even from their mobile phone. When a customer initiates an online sales transaction via a browser-based interface, the integrated business system can process the order, update accounts receivable, update inventory databases and other ERP-based systems, and can also automatically update strategic customer information databases and other CRM-based systems. These modules and other applications and functionalities may advantageously be integrated and executed by a single code base accessing one or more integrated databases as necessary, forming an integrated business management system or platform.

As noted with regards to FIG. 6, the integrated business system shown in FIG. 7 may be hosted on a distributed computing system made up of at least one, but typically multiple, "servers." A server is a physical computer dedicated to providing data storage and an execution environment for one or more software applications or services intended to serve the needs of the users of other computers that are in data communication with the server, for instance via a public network such as the Internet or a private "intranet" network.

Rather than build and maintain such an integrated business system themselves, a business may utilize systems provided by a third party. Such a third party may implement an integrated business system/platform as described above in the context of a multi-tenant platform, wherein individual instantiations of a single comprehensive integrated business system are provided to a variety of tenants. One advantage to such multi-tenant platforms is the ability for each tenant to customize their instantiation of the integrated business system to that tenant's specific business needs or operational methods. Each tenant may be a business or entity that uses the multi-tenant platform to provide business data and functionality to multiple users. Some of those multiple users may have distinct roles or responsibilities within the business or entity.

In some cases, a tenant may desire to modify or supplement the functionality of an existing platform application by introducing an extension to that application, where the extension is to be made available to the tenant's employees and/or customers. In some cases, such an extension may be applied to the processing of the tenant's business related data that is resident on the platform. The extension may be developed by the tenant or by a 3rd party developer and then made available to the tenant for installation. The platform may include a "library" or catalog of available extensions, which can be accessed by a tenant and searched to identify an extension of interest. Software developers may be permitted to "publish" an extension to the library or catalog after appropriate validation of a proposed extension.

Thus, in an effort to permit tenants to obtain the services and functionality that they desire (which may include providing certain services to their end customers, such as functionality associated with an eCommerce platform), a multi-tenant service platform may permit a tenant to configure certain aspects of the available service(s) to better suit their business needs. In this way aspects of the service platform may be customizable, and thereby enable a tenant to configure aspects of the platform to provide distinctive services to their respective users or to groups of those users. For example, a business enterprise that uses the service platform may want to provide additional functions or capabilities to their employees and/or customers, or to cause their business data to be processed in a specific way in accordance with a defined workflow that is tailored to their business needs, etc.

Tenant customizations to the platform may include custom functionality (such as the capability to perform tenant or user-specific functions, data processing, or operations) built on top of lower level operating system functions. Some multi-tenant service platforms may offer the ability to customize functions or operations at a number of different levels of the service platform, from aesthetic modifications to a graphical user interface to providing integration of components and/or entire applications developed by independent third party vendors. This can be very beneficial, since by permitting use of components and/or applications developed by third party vendors, a multi-tenant service can significantly enhance the functionality available to tenants and increase tenant satisfaction with the platform.

As noted, in addition to user customizations, an independent software developer may create an extension to a particular application that is available to users through a multi-tenant data processing platform. The extension may add new functionality or capabilities to the underlying application. One or more tenants/users of the platform may wish to add the extension to the underlying application in order to be able to utilize the enhancements to the application that are made possible by the extension. Further, the developer may wish to upgrade or provide a patch to the extension as they recognize a need for fixes or additional functionality that would be beneficial to incorporate into the extension. In some cases, the developer may prefer to make the upgrade available to only a select set of users (at least initially) in order to obtain feedback for improving the newer version of the extension, to test the stability of the extension, or to assist them to segment the market for their extension(s).

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that when executed by a processor of a computer causes the processor to:
   extract, by a messaging module, message data of a message from a source database, wherein the message data is extracted according to a database data format used by the source database to store the message data such that the message data is to be transmitted as a transaction message over a blockchain network that supports a blockchain message format different than the database data format, wherein the message data is received through a channel-in interface associated with the messaging module;
   evaluate the message data to identify a message type of the message;
   select a message template from a set of previously generated message templates corresponding to different message types, wherein the message template is selected based upon the message template having a message type corresponding to the message type of the message;
   parse the message data to decompose the message data from the database data format into a set of parameter values such that the set of parameter values correspond to values of fields from the extracted message data;
   populate the message template with the set of parameter values to create the transaction message in the block chain message format, wherein parameter values are inserted into parameters within the message template having matching parameter types such that the parameters are formatted as one or more blocks that are linked using pointers and cryptography which are inserted into the blockchain network; and
   route the transaction message through a channel-out interface associated with the messaging module to a blockchain node that routes the transaction message over the blockchain network to a destination adapter associated with a destination database that will process the transaction message such that the transaction message includes instructions on how to read the transaction message transmitted over the blockchain network.

2. The non-transitory computer-readable medium of claim 1, wherein the instructions comprise instructions to:
process the set of parameter values to remove parameter values not supported by the blockchain message format.

3. The non-transitory computer-readable medium of claim 1, wherein the instructions comprise instructions to:
process the set of parameter values to adjust a size of parameter values that exceed a size limit supported by the blockchain message format.

4. The non-transitory computer-readable medium of claim 1, wherein the instructions comprise instructions to:
receive a second transaction message from the blockchain node, wherein the second transaction message is formatted according to the blockchain message format;
evaluate the second transaction message to identify a second message type of the second transaction message;
select a second message template from the set of previously generated message templates based upon the second message template having a message type corresponding to the second message type of the second transaction message;
parse the second transaction message to decompose the second transaction message into a set of message data values: populate the second message template with the set of message data values to create a database transaction in the database data format; and
execute the database transaction to populate the set of message data values into the source database.

5. The non-transitory computer-readable medium of claim 1, wherein the instructions comprise instructions to:
execute a date validation process upon the set of parameter values to validate date parameter values to populate into the message template.

6. The non-transitory computer-readable medium of claim 1, wherein the instructions comprise instructions to:
execute an arithmetic calculation using one or more parameter values as input to calculate a result as a parameter value to populate into the message template.

7. The non-transitory computer-readable medium of claim 1, wherein the instructions comprise instructions to:
execute a logical operation using one or more parameter values as input to calculate a result as a parameter value to populate into the message template.

8. The non-transitory computer-readable medium of claim 1, wherein the instructions comprise instructions to:
route the transaction message as a bank transaction between a first bank and a second bank.

9. The non-transitory computer-readable medium of claim 1, wherein the instructions comprise instructions to:
execute a transformation operation upon a parameter value to transform the parameter value to create a transformed parameter value to populate into the message template.

10. A computing system, comprising:
a processor connected to memory; and
a messaging module stored on a non-transitory computer readable medium and configured with instructions that when executed by the processor cause the processor to:
extract, by a messaging module, message data of a message from a source database, wherein the message data is extracted according to a database data format used by the source database to store the message data such that the message data is to be transmitted as a transaction message over a blockchain network that supports a bkckchain message format different than the database data format, wherein the message data is received through a channel-in interface associated with the messaging module;
evaluate the message data to identify a message type of the message;
select a message template from a set of previously generated message templates corresponding to different message types, wherein the message template is selected based upon the message template having a message type corresponding to the message type of the message;
parse the message data to decompose the message data from the database data format into a set of parameter values such that the set of parameter values correspond to values of fields from the extracted message data;
populate the message template with the set of parameter values to create the transaction message in the blockchain message format, wherein parameter values are inserted into parameters within the message template having matching parameter types such that the parameters are formatted as one or more blocks that are linked using pointers and cryptography which are inserted into the blockchain network; and
route the transaction message through a channel-out interface associated with the messaging module to a blockchain node that routes the transaction message over the blockchain network to a destination adapter associated with a destination database that will process the transaction message such that the transaction message includes instructions for how to read the transaction message transmitted over the blockchain network.

11. The computing system of claim 10, wherein the instructions comprise instructions that cause the processor to:
process the set of parameter values to remove parameter values not supported by the blockchain message format.

12. The computing system of claim 10, wherein the instructions comprise instructions that cause the processor to:
process the set of parameter values to adjust a size of parameter values that exceed a size limit supported by the blockchain message format.

13. The computing system of claim 10, wherein the instructions comprise instructions that cause the processor to:
receive a second transaction message from the blockchain node, wherein the second transaction message is formatted according to the blockchain message format;
evaluate the second transaction message to identify a second message type of the second transaction message;
select a second message template from the set of previously generated message templates based upon the second message template having a message type corresponding to the second message type of the second transaction message;
parse the second transaction message to decompose the second transaction message into a set of message data values;

populate the second message template with the set of message data values to create a database transaction in the database data format; and execute the database transaction to populate the set of message data values into the source database.

14. The computing system of claim 10, wherein the instructions comprise instructions that cause the processor to:

route the transaction message as a bank transaction between a first bank and a second bank.

15. A computer-implemented method, the computer-implemented method involving a computing device comprising a processor, and the computer-implemented method comprising:

extracting, by the processor through a messaging module, message data of a message from a source database, wherein the message data is extracted according to a database data format used by the source database to store the message data, wherein the message data is to be transmitted as a transaction message over a blockchain network that supports a blockchain message format different than the database data format, wherein the message data is received through a channel-in interface associated with the messaging module;

evaluating, by the processor, the message data to identify a message type of the message;

selecting, by the processor, a message template from a set of previously generated message templates corresponding to different message types, wherein the message template is selected based upon the message template having a message type corresponding to the message type of the message;

parsing, by the processor, the message data to decompose the message data from the database data format into a set of parameter values such that the set of parameter values correspond to values of fields from the extracted message data;

populating, by the processor, the message template with the set of parameter values to create the transaction message in the blockchain message format, wherein parameter values are inserted into parameters within the message template having matching parameter types such that the parameters are formatted as one or more blocks that are linked using pointers and cryptography which are inserted into the blockchain network; and routing, by the processor, the transaction message through a channel-out interface associated with the messaging module to a blockchain node that routes the transaction message over the blockchain network to a destination adapter associated with a destination database that will process the transaction message such that the transaction message includes instructions for how to read the transaction message transmitted over the blockchain network.

16. The computer-implemented method of claim 15, wherein the instructions comprise instructions that cause the processor to:

execute a date validation process upon the set of parameter values to validate date parameter values to include within the message template.

17. The computer-implemented method of claim 15, wherein the instructions comprise instructions that cause the processor to:

execute an arithmetic calculation using one or more parameter values as input to calculate a result as a parameter value to populate into the message template.

18. The computer-implemented method of claim 15, wherein the instructions comprise instructions that cause the processor to:

execute a logical operation using one or more parameter values as input to calculate a result as a parameter value to populate into the message template.

19. The computer-implemented method of claim 15, wherein the instructions comprise instructions that cause the processor to:

route the transaction message as a bank transaction between a first bank and a second bank.

20. The computer-implemented method of claim 15, wherein the instructions comprise instructions that cause the processor to:

execute a transformation operation upon a parameter value to transform the parameter value to create a transformed parameter value to populate into the message template.

* * * * *